April 29, 1969 R. P. TUINILA ET AL 3,441,933

RADIO FREQUENCY ABSORBER

Filed April 3, 1967

INVENTORS
RAYMOND P. TUINILA
RICHARD O. BAYRD

BY Irving S. Rappaport

ATTORNEY

United States Patent Office
3,441,933
Patented Apr. 29, 1969

3,441,933
RADIO FREQUENCY ABSORBER

Raymond P. Tuinila, Beverly, and Richard O. Bayrd, Wakefield, Mass., assignors to Raytheon Company, Lexington, Mass., a corporation of Delaware Filed Apr. 3, 1967, Ser. No. 628,039
Int. Cl. G01s 7/36
U.S. Cl. 343—18 22 Claims

ABSTRACT OF THE DISCLOSURE

A radio frequency energy absorber comprising a material having a plurality of layers, each of the layers including a plurality of porous, hollow, ceramic spheres of substantially uniform diameter within a layer and varying in diameter from layer to layer, the layers containing the larger spheres being exposed to the radio frequency energy before the layers containing the smaller spheres, the effective absorption depth of the absorber being several times greater than its geometric dimensions.

*Background of the invention*

The present invention relates to a radio frequency (RF) energy absorber. A need exists for RF absorber materials which are capable of absorbing energy densities of 20–30 watts/in.$^2$ Such high energy absorbers have become increasingly necessary to operational radio systems in order to shield personnel from dangerous levels of microwave radiation. Because of the radar performance specifications on side lobes, a high energy absorber must be well matched to the incident radiation, i.e., the reflection co-efficient must be extremely low.

One approach presently used is to employ a cooling air system in conjunction with a low power absorber. Due to the limitation of the present materials, it is necessary to use gradient absorbers because the common pyramidal type absorbers melt at the tips under high power illumination. The gradient absorbers are generally foam materials such as silica or glass having attenuator materials added thereto. It is known that 17 watt/in.$^2$ irradiation raises the temperature of a typical absorber material to 1100° F. At this temperature, available absorber materials degrade irreversibly. The air cooling system can be used to reduce the operating temperature to approximately 330° F. but the consequences of the stoppage of air flow results in degradation of the material. A further problem exists in that the presently used foam materials are not uniform in pore size or void distribution. As a result, the dielectric absorption varies from point to point within the material.

An object of the present invention is to provide RF energy absorbers which overcomes the difficulties of the prior art.

Another object of the present invention is to provide a dielectric gradient absorber which is highly uniform with respect to pore size.

Another object of the present invention is to provide a dielectric gradient absorber in which void formation is entirely eliminated.

Still another object of the present invention is to provide a dielectric gradient absorber which is relatively light, physically strong and relatively porous thereby allowing for efficient air cooling.

The RF energy absorber of the present invention is characterized by the following features and advantages:

(1) Maximization of internal energy reflections, thereby severely limiting the amount of back-scatter of the impinging RF energy; (2) The absorption depth of the material may be several times greater than the geometric dimensions; (3) RF reflectance from the front face of the absorbers is minimized by absorbing the difference in dielectric constants between air and the absorber; (4) By adjusting the dielectric loss characteristics and thickness of the layers of the absorber, it is possible to realize up to 40 db absorption of S-band radiation in an absorber thickness of two inches; (5) An absorber capable of operating without permanent degradation of electrical or physical properties at temperatures expected when and if cooling air flow is interrupted; (6) Because the absorber is completely porous it will not develop hot spots because of the lack of direct air cooling; (7) The absorber body can be produced with a predictable high yield at a cost appreciably lower than that of presently available materials; and (8) The absorber material may be manufactured in any one of a variety of ways employing a number of different materials and in any desired shape depending on the application.

*Summary of the invention*

A radio frequency energy absorber comprising a material having a plurality of layers, each of the layers including a plurality of porous, hollow, ceramic spheres of substantially uniform diameter within a layer and varying in diameter from layer to layer, the layers containing the larger spheres being exposed to the radio frequency energy before the layers containing the smaller spheres, the effective absorption depth of the absorber being several times greater than its geometric dimensions.

*Description of the preferred embodiments*

Figure 1:
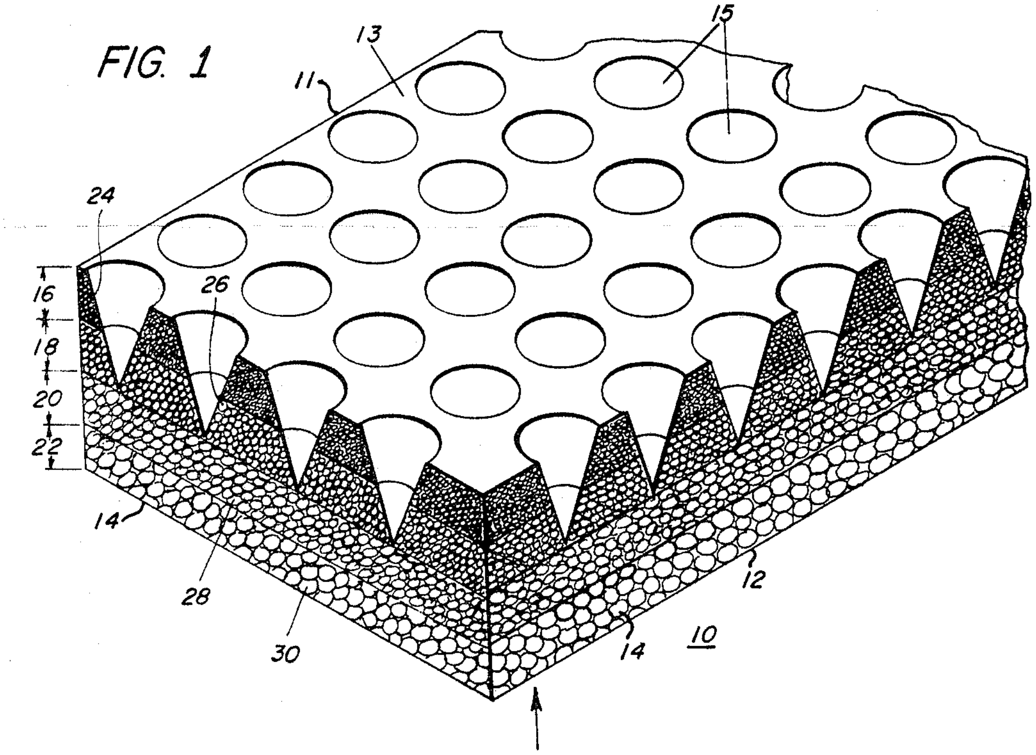
FIG. 1 is a partial section diagram of the present invention.

FIG. 1 shows a RF energy absorber 10 embodying the present invention. The absorber 10 is shown as a block of material 11 having a front face 12, a back face 13 and cut away side faces 14. Located in the back face 13 and extending towards the front face 12 of the block 11 are a plurality of conically shaped openings 15. The block 11 has a plurality of layers 16, 18, 20 and 22. Each of the layers 16 through 22 consist of a plurality of porous, hollow, ceramic spheres bonded together with an appropriate cement. The layer 16 includes spheres 24 all of a substantially uniform diameter. In a like manner, the layers 18, 20 and 22 include pluralities of spheres 26, 28 and 30 all of substantially uniform diameter within each layer. The plurality of spheres 24 through 30 are of uniform diameter within the respective layers 16 through 22 but vary in diameter from one layer to another. As shown in FIG. 1, the plurality of spheres 30 included in layer 22 which begins at the front face 12 of the block 11 are of larger diameter than the plurality of spheres 28 of layer 20. The diameters of the plurality of spheres 24 through 30 vary consecutively with the largest spheres included in layer 22 and the smallest spheres included in the layer 16.

Figure 2:
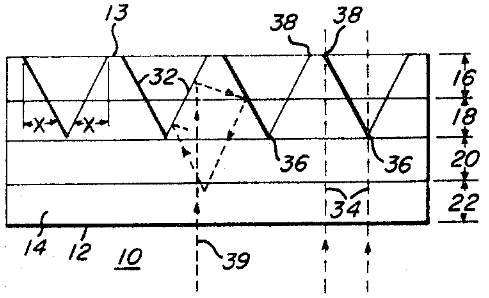
FIG. 2 shows a view of one face of the invention shown in FIG. 1.

FIG. 2 shows a view of one of the side faces 14 of the block 11. The openings 15 in the back face 13 of the block 11 are defined by sloping walls 32 which have an internal angle of incidence with respect to the vertical axis of the openings of X°. FIG. 2 does not show the plurality of spheres included within each of the layers 16 through 22 in order that the electrical properties of the absorber 10 may be better understood. The dotted lines 34 represent RF energy which is not completely absorbed by the absorber 10. The absorber 10 is positioned so that the front face 12 of the block 11 is directly exposed to the source of the RF energy as shown by the solid arrow. The energy represented by the dotted lines 34 enter the block 11 through the front face 12 and proceed to exit the block 11 at point 36 and point 38 which is on the back face 13 of the block 11. Points 36 and 38 represent the only points of vulnerability of the absorber 10 to RF energy. The dotted line 39 represents the typical result of RF energy entering the absorber 10. The energy enters through the front face 12 and passes through the layers until it strikes a sloping wall 32. Upon striking the sloping wall 32, the energy is reflected in another direction towards the front face 12. It then might strike another sloping wall 32 whereupon it is again reflected in another direction. The energy continues to bounce around inside the absorber 10 until all the energy is completely dissipated. Internal reflection is provided not only by the sloping walls 32 but the pluralities of hollow spheres 24 through 30 within each of the layers 16 through 22 also act to absorb the energy causing it to bounce in all directions within the absorber until completely dissipated. The greater the energy to be absorbed within the block 11, the greater the heat dissipated.

Figure 3:
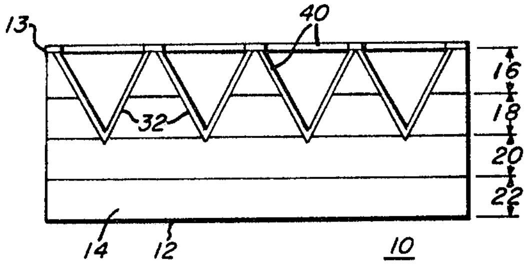
FIG. 3 shows an alternative embodiment of the present invention from that shown in FIGS. 1 and 2.
Figure 4:
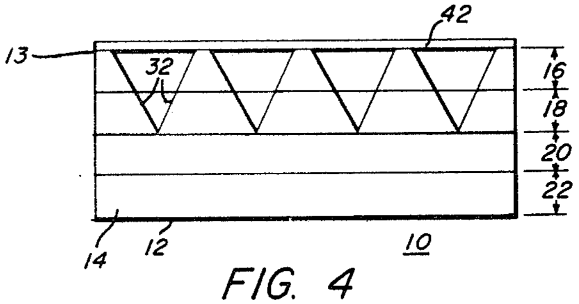
FIG. 4 shows another alternative embodiment of the invention shown in FIGS. 1 and 2.

If it is desired to eliminate the small loss of energy which escapes at the points 36 and 38 of block 11 shown in FIG. 2, an alternative embodiment of the invention may be employed as shown in FIG. 3. In the embodiment of FIG. 3, a reflector 40 may be applied to the back face 13 of the block 11. In so applying the reflector 40, the back face 13 and the openings 15 are completely masked by the reflector 40. In this way, no energy is allowed to escape through the absorber 10 but all energy is completely dissipated within the block 11. The reflector 14 may be applied by flame-spraying molding in aluminum foil, or any other method for applying a metallized layer. Another type of reflector is shown in FIG. 4. If there is no desire to employ a reflector such as 40 in FIG. 3 which covers not only the back face 13 but also masks the sloping walls 32, a flat metal plate 42 may be applied to the back face 13 of the block 11. The plate 42 acts in the same manner as the reflector 40 to prevent the escape of any energy through the back face 13 of the block 11. It is also possible to prevent the escape of energy through back face 13 by including metallic particles within the layers of the block.

The block 11 shown in FIGS. 1–4 has as one of its properties, the fact that it is extremely porous so that it may be effectively air cooled by passing air through the block 11. In addition, the block 11 has uniform pore size and there is no possibility of any void formations. The block 11 shown in FIGS. 1–4 may be subjected to temperatures as high as 2400° F. Therefore, the block is capable of absorbing at least 20–30 watts/in.$^2$ without suffering any permanent degradation of physical or electrical properties.

The RF energy absorber of the present invention may be made in a number of ways using different materials. Cements utilizing aluminum phosphate, barium titanate and titanium oxide among others may be employed. The spheres in all examples are made of aluminum oxide ($AlO_3$) but other materials having the same properties of $AlO_3$ may be used. A few examples of the methods of making the energy absorber of the present invention will now be presented.

EXAMPLE I

One type of absorber of the present invention employs barium titanate as the basic material for cementing the spheres. Table 1 below shows the constituents and amounts for preparing the material.

TABLE 1

| Material: | Grams |
|---|---|
| $AlO_3$ spheres | 250 |
| $H_3PO_4$ | 60 |
| $BaTiO_3$ | 50 |
| Bentonite | 5 |
| $AlPO_4$ | 45 |
| Absorbing material | (1) |

1 Determined by the Application.

The absorbing material such as graphite, barium titanate, carbon block, nickel oxide, etc., may be added in varying quantities to the mix as each layer is prepared. The amount and type of absorbing material added is determined by the physical and electrical characteristics desired for the absorber. The end use of the absorber also determines the size and shape of the absorber and whether a reflector such as 40 or 42 is needed. Any electrically lossy material which is compatible with the other constituents may be used as the absorbing material when it is mixed directly with the constituents. Noncompatible absorbing materials may be used as a surface coating after the layers are prepared rather than adding directly as the constituents are being mixed. Examples of noncompatible absorbing materials are iron, carbonyl E and other similar materials which would be attacked by the acid if mixed directly with the constituents. The listed constituents are all mixed together so as to form a homogeneous mixture. The four layers 16–22 each have different diameter spheres. The mixed amounts for the constituents represent the basic formula for producing a layer of the material. A multiplication factor is applied to the basic formula in order to determine the exact amount of constituents necessary for a given layer.

The following Table 2 represents the range of diameters for each of the layers of the block and the respective multiplication factor.

TABLE 2

| | Diameter of spheres (D) in inches | Multiplication factor |
|---|---|---|
| Layer 16 | $D < .041$ | 2.0 |
| Layer 18 | $.041 \geq D \geq .086$ | 2.5 |
| Layer 20 | $.086 \geq D \geq .111$ | 2.5 |
| Layer 22 | $.111 \geq D \geq .221$ | 3.0 |

In preparing layer 16 a multiplication factor of 2.0 is applied to the constituents. After the constituents are all mixed, the layer 16 is poured into a mold and is packed and tamped into the desired configuration. After the mold is completed, it is heated for a period of one hour at 250° F. After this initial heating period, the mold is removed so that it may be used again. Finally, the layer is heated for two hours at 1100° F.

The same basic procedure is followed for each of the layers until the entire block is completed. The heating steps may take place after each layer is packed and tamped or may be done after all the layers have been packed and tamped. The appropriate multiplication factor for the remaining layers 18, 20 and 22 are shown in Table 2. The RF energy absorber produced by this method with the above quantities for the constituents will be a block 12 x 18 x 2 inches. The 2 inch thickness of the block will consist of four ½ inch layers making up the four layers 16, 18, 20 and 22 as shown in FIGS. 1–4.

EXAMPLE 2

Another type of absorber of the present invention employs aluminum phosphate as the basic material for cementing the spheres. Table 3 shows the constituents and amounts for preparing the material.

TABLE 3

| Material: | Grams |
|---|---|
| $AlO_3$ spheres | 250 |
| $H_3PO_4$ | 45 |
| Bentonite | 3 |
| $AlOH_3$ | 45 |
| $AlPO_4$ | 10 |
| Absorbing material | (1) |

1 Determined by the application.

The listed constituents are all mixed together except the $AlPO_4$ so as to form a homogeneous mixture. Then the $AlPO_4$ is added separately. The four layers 16–22 each have different diameter spheres. The addition of and type of absorbing material which is added is governed by the same criteria as in Example 1 above. The listed amounts for the constituents represent the basic formula for producing a layer of the material. A multiplication factor is applied to the basic formula in order to determine the exact amount of constituents necessary for a given layer.

Table 2 above represents the range of diameters for each of the layers of the block. In preparing layer 16, a multiplication factor of 2.0 is applied to the constituents. After the constituents are all mixed, the layer 16 is poured into a mold and is packed and tamped into the desired configuration. After the mold is completed, it is heated for a period of one hour at 250° F. After this initial heating period, the mold is removed so that it may be used again. Finally, the layer is heated for two hours at 1100° F.

The same basic procedure is followed for each of the layers until the entire block is completed. As in Example 1, the heating steps may take place after all the layers have been packed and tamped rather than after each layer is prepared. The appropriate multiplication factor for the remaining layers 18, 20 and 22 are shown in Table 2. The RF energy absorber produced by this method with the above quantities for the constituents will be a block 12 x 18 x 2 inches. The 2 inch thickness of the block will consist of 4½ inch layers making up the four layers 16, 18, 20 and 22 as shown in FIGS. 1–4.

The mixing of the constituents must be performed in glass containers and utilizing glass equipment. If metal equipment is used it will be subject to being destroyed by the acid constituent.

By selecting spheres of uniform diameter for each layer in conjunction with the particular cement, it is possible to prepare blocks with controlled, uniform dielectric characteristics. By constructing the block of ¼ wavelength thick layers of spheres of diminishing diameters, it is possible to produce an absorber with a low dielectric incident face to produce a dielectric constant close to that of air with a depth of penetration in ¼ wavelength steps. This close air/dielectric constant match minimizes surface reflection of the incident energy while the ¼ wavelength thickness utilizes the interference reflection principle to minimize reflections from the surface of the layer. Internal back reflection from the layers with the larger diameter spheres is minimized by the tapering of dielectric constant from the layers with the larger diameter spheres to those with the smaller diameter spheres.

An additional degree of freedom in the design of the absorber is present in the selection of the constituents and distribution of the cement used. The dielectric loss characteristics are almost infinitely variable. Also the absorber may be subjected to very high temperature without the degradation of the electrical and physical properties and parameters.

Obviously many modifications and variations of the present invention are possible in the light of the above teachings. It is therefore to be understood that within the scope of the appended claims the invention may be practiced otherwise than is specifically described.

We claim:

1. An energy absorber comprising:
a material having a plurality of layers of uniform diameter spheres within each layer, the spheres varying consecutively in diameter from layer to layer and the effective absorption depth of said absorber being several times greater than its physical dimensions.

2. An energy absorber as set forth in claim 1 wherein said spheres are porous, hollow ceramic spheres.

3. An energy absorber as set forth in claim 1 wherein said spheres are hollow.

4. An energy absorber as set forth in claim 1 wherein said spheres are porous.

5. An energy absorber as set forth in claim 1 wherein said spheres are ceramic.

6. A radio frequency energy absorber comprising:
a material having a plurality of layers;
each of said layers including a plurality of porous, hollow ceramic spheres of substantially uniform diameter within a layer and varying in diameter from layer to layer;
the layers containing the larger spheres being exposed to the RF energy before the layers containing the smaller spheres, the effective absorption depth of said absorber being several times greater than its geometric dimensions.

7. A radio frequency energy absorber as set forth in claim 6 wherein the diameters of said spheres vary consecutively from layer to layer.

8. A radio frequency absorber as set forth in claim 6 wherein said spheres are all made of aluminum oxide.

9. A radio frequency energy absorber comprising:
a material having a plurality of layers;
each of said layers including a plurality of closely packed, porous, hollow, ceramic spheres of substantially uniform diameter within each layer and varying consecutively in diameter from layer to layer;
said material having a front, back and side faces, said back face having a plurality of openings defined therein and extending into said material toward said front face, said openings being arranged in evenly spaced rows and columns;
the layers of spheres decreasing consecutively in sphere diameters from said front face to said back face, whereby energy entering said front face will be substantially completely dissipated within said material.

10. An absorber as set forth in claim 9 wherein said material comprises four ¼ wavelength thick layers.

11. An absorber as set forth in claim 9 wherein said spheres are all made of aluminum oxide.

12. An absorber as set forth in claim 10 wherein said spheres have the following diameters in inches:

$$0 < D_1 < .041$$
$$.041 \leq D_2 \leq .086$$
$$.086 \leq D_3 \leq .111$$
$$.111 \leq D_4 \leq .221$$

where $D_1$ through $D_4$ represent the range of diameters of spheres within each of the respective layers from said back to said front face.

13. An absorber as set forth in claim 9 wherein the spheres within each of the layers are bonded together with a barium titanate cement.

14. An absorber as set forth in claim 9 wherein the spheres within each of the layers are bonded together with an aluminum phosphate cement.

15. An absorber as set forth in claim 9 wherein the spheres within each of the layers are bonded together with a titanium oxide cement.

16. An absorber as set forth in claim 9 wherein each of said openings is conically shaped with the widest portion of said opening being located at said back face, sloping walls being formed by said openings and extending into said material toward said front face, said walls acting to reflect energy back towards said front face.

17. A radio frequency energy absorber comprising:
a material having a plurality of layers;
each of said layers including a plurality of closely packed, porous, hollow, ceramic spheres of substantially uniform diameter within each layer and varying consecutively in diameter from layer to layer;
said material having a front, back and side faces, said back face having a plurality of openings defined therein and extending into said material toward said front face, said openings being arranged in evenly spaced rows and columns;

the layers of spheres decreasing consecutively in sphere diameters from said front face to said face, whereby energy entering said front face will be substantially completely dissipated within said material;

said material comprising four ¼ wavelength thick layers;

said spheres all being made of aluminum oxide;

said spheres have the following diameters in inches:

$$0<D_1<.041$$
$$.041\leq D_2\leq .086$$
$$.086\leq D_3\leq .111$$
$$.111\leq D_4\leq .221$$

where $D_1$ through $D_4$ represent the range of diameters of the spheres within each of the respective layers from said back to said front faces;

said spheres being bonded together with a cement which is selected from the group of constituents comprising barium titanate, aluminum phosphate and titanium oxide;

said openings being conically shaped with the widest portion of said opening being located at said back face, sloping walls being formed by said openings and extending into said material toward said front face, said walls acting to reflect energy back towards said front face.

18. An energy absorber comprising:

a material having a plurality of layers of uniform sized particles within each layer, the particles varying consecutively in size from layer to layer and the effective absorption depth of said absorber being several times greater than its physical dimensions.

19. An energy absorber comprising:

a body having a plurality or layers of particles within each layer, the particles varying consecutively in size from layer to layer and the effective absorption of said absorber being greater than its physical dimensions.

20. An energy absorber as set forth in claim 19 wherein said particles are hollow.

21. An energy absorber as set forth in claim 19 wherein said particles are porous.

22. An energy absorber as set forth in claim 19 wherein said particles are ceramic.

References Cited

UNITED STATES PATENTS

| | | | |
|---|---|---|---|
| 2,267,918 | 12/1941 | Hildabolt | 75—208 XR |
| 2,464,517 | 3/1949 | Kurtz | 75—208 XR |
| 2,293,843 | 8/1942 | Marvin | 75—208 |

RODNEY D. BENNETT, *Primary Examiner.*

BRIAN L. RIBANDO, *Assistant Examiner.*